(12) United States Patent
Toyama

(10) Patent No.: US 12,553,509 B2
(45) Date of Patent: Feb. 17, 2026

(54) CASE

(71) Applicants: JATCO LTD, Fuij (JP); Nissan Motor Co., Ltd., Yokohama (JP)

(72) Inventor: Hisashi Toyama, Shizuoka (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,918

(22) PCT Filed: Mar. 22, 2023

(86) PCT No.: PCT/JP2023/011172
§ 371 (c)(1),
(2) Date: Sep. 13, 2024

(87) PCT Pub. No.: WO2023/182340
PCT Pub. Date: Sep. 28, 2023

(65) Prior Publication Data
US 2025/0043859 A1 Feb. 6, 2025

(30) Foreign Application Priority Data
Mar. 22, 2022 (JP) ................ 2022-045106

(51) Int. Cl.
*F16H 57/02* (2012.01)
*F16H 57/021* (2012.01)
*F16H 57/03* (2012.01)

(52) U.S. Cl.
CPC ........... *F16H 57/03* (2013.01); *F16H 57/021* (2013.01); *F16H 2057/02091* (2013.01)

(58) Field of Classification Search
CPC ........ F16H 57/02; F16H 57/021; F16H 57/03; F16H 2057/02017; F16H 2057/02091
See application file for complete search history.

(56) References Cited

U.S. PATENT DOCUMENTS 3,246,538 A * 4/1966 Easton ..................... F16H 1/20
74/606 R
3,905,250 A * 9/1975 Sigg ........................ F16C 17/03
74/665 N (Continued)

FOREIGN PATENT DOCUMENTS

| CN | 108361353 A | * | 8/2018 | ............. F16H 57/03 |
| CN | 109555827 A | * | 4/2019 | ............. F16H 37/00 |

(Continued)

*Primary Examiner* — Adam D Rogers
(74) *Attorney, Agent, or Firm* — Spencer Fane LLP

(57) ABSTRACT

A case for housing a driving force transmission device includes a wall section defining a through-hole through which a shaft is configured to pass. The wall section, as viewed from an axial direction, includes an annular section surrounding the through-hole, first ribs that extend radially outward from the annular section, a second rib that crosses a vertical line that passes through an axial center of the shaft from one side to the other side, and a recess that opens at a bottom end surface of the wall section, and recessed in a direction along the vertical line. A bottom surface of the recess has a shape such that a side farther from the vertical line is located closer to a bottom end surface side. A region of the wall section in which the recess is provided is connected to one end of the second rib.

6 Claims, 13 Drawing Sheets

(56) References Cited

U.S. PATENT DOCUMENTS

| | | | | |
|---|---|---|---|---|
| 4,108,021 A | * | 8/1978 | MacAfee | B60K 17/3467 |
| | | | | 74/606 R |
| 8,911,312 B2 | * | 12/2014 | Itoo | F16H 57/0489 |
| | | | | 474/93 |
| 12,416,353 B2 | * | 9/2025 | Toyama | F16H 57/02 |
| 2020/0400225 A1 | * | 12/2020 | Smith | F16H 57/032 |
| 2024/0369131 A1 | * | 11/2024 | Toyama | F16H 57/03 |

FOREIGN PATENT DOCUMENTS

| | | | | | |
|---|---|---|---|---|---|
| CN | 111442076 A | * | 7/2020 | | F16H 57/03 |
| CN | 118257833 A | * | 6/2024 | | F16H 57/0484 |
| CN | 118548324 A | * | 8/2024 | | F16H 57/03 |
| JP | 2000-136868 A | | 5/2000 | | |
| JP | 2009-047230 A | | 3/2009 | | |
| JP | 2023139340 A | * | 10/2023 | | |

\* cited by examiner

CASE

CROSS-REFERENCE TO RELATED APPLICATIONS

This application is a U.S. national stage application of International Application No. PCT/JP2023/011172, filed on Mar. 22, 2023. This application also claims priority to Japanese Patent Application No 2022-045106, filed on Mar. 22, 2022.

BACKGROUND

Technical Field

The present invention relates to a case.

Background Information

Japanese Patent Laid-Open Publication No. 2009-047230 discloses a transmission case that includes a flange section and arcuate ribs. The transmission case of the above-mentioned publication reduces fluid resistance by passing molten metal through the flange section and the arcuate ribs during casting.

SUMMARY

This type of case includes an annular section that supports a driveshaft and ribs that extend radially from the annular section. Transmission cases are sometimes provided with holes around the annular section through which components are passed, and thick-walled sections for forming oil passages. Therefore, there may sometimes be places where ribs cannot be provided.

This type of case is formed by casting. During casting, molten metal in the casting mold is supplied to each part through recesses corresponding to the ribs. Molten metal is difficult to supply to areas where there are no recesses that correspond to the ribs. As a result, an imbalance occurs in the flow of molten metal within the casting mold, which may produce cavities in the case after molding. The occurrence of cavities decreases case yield.

Thus, there is a need to provide a case that reduces the occurrence of cavities and improves yield.

A case according to one aspect of the present disclosure is a case for housing a driving force transmission device, wherein the case has a wall section provided with a through-hole through which a shaft passes that transmits driving force, the wall section, as viewed from the axial direction of the shaft, includes an annular section surrounding the through-hole, a plurality of first ribs that extend radially outward from the annular section, and a second rib that crosses a vertical line that passes through the axial center of the shaft from one side to the other, the wall section, as viewed from the axial direction, includes a recess that opens at a bottom end surface of the wall section, the recess is recessed in a direction along said vertical line, the bottom surface of the recess, as viewed from the axial direction has a shape such that the side farther from the vertical line is located closer to the bottom end surface side, and a region of the wall section in which the recess is provided is connected to one end section of the second rib.

According to one aspect of the present disclosure, a case in which the occurrence of cavities is reduced and that exhibits improved yield can be provided.

BRIEF DESCRIPTION OF THE DRAWINGS

Referring now to the attached drawings which form a part of this original disclosure.

DETAILED DESCRIPTION

Figure 1:
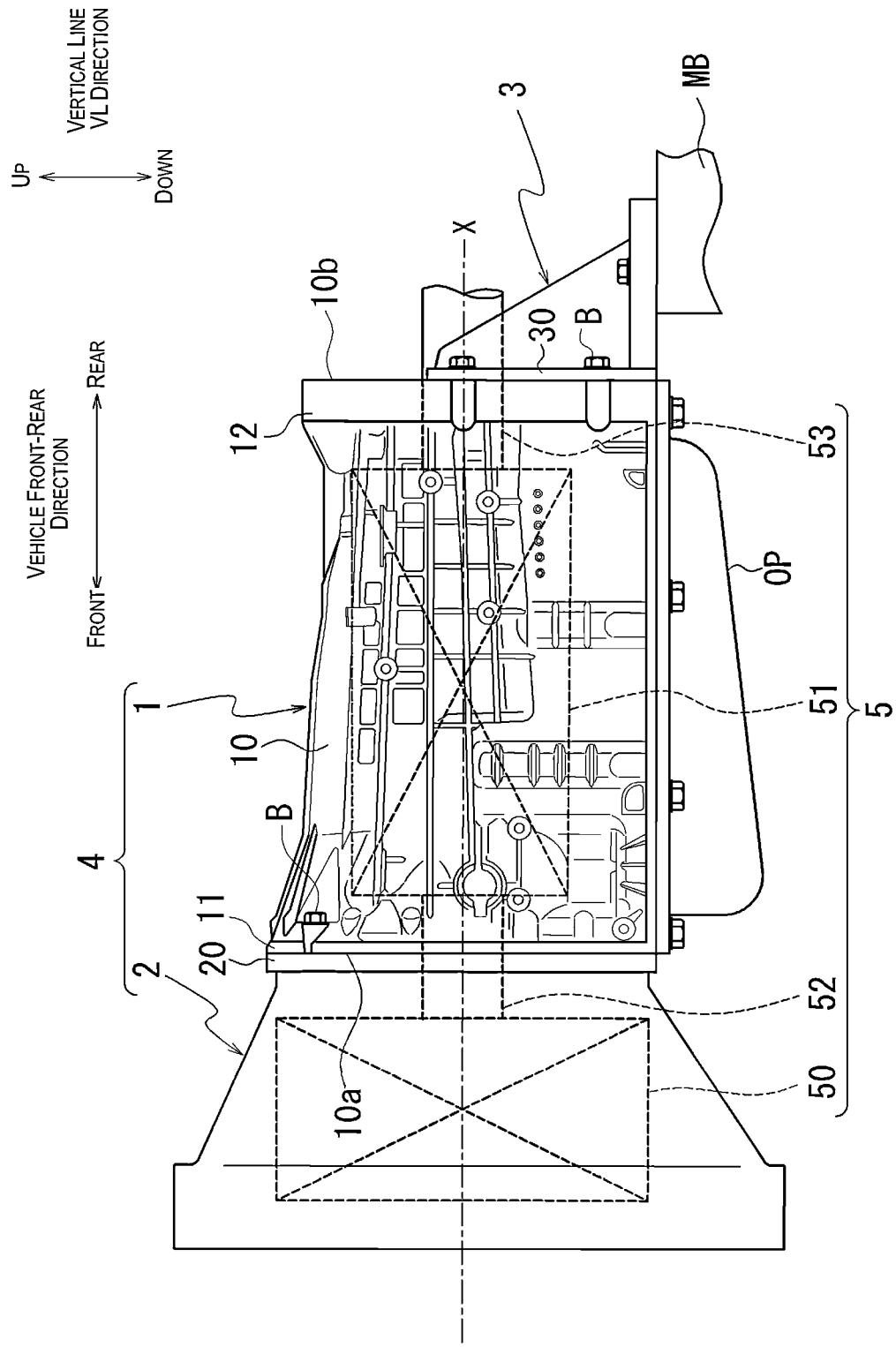
FIG. 1 is a diagram illustrating an automatic transmission case.

An embodiment will be described below. In the present embodiment, a transmission case 1 for a vehicle will be described as one aspect of the case.

Note that if the drawings show a plurality of elements (parts, sections, etc.) aligned in a prescribed direction, it may be assumed that there is text in the description in the specification that indicates that the plurality of elements overlap when viewed from the prescribed direction. The "prescribed direction" is, for example, the axial direction, radial direction, direction of gravity, direction of travel of the vehicle (forward movement direction of the vehicle, backward movement direction of the vehicle), etc.

"Viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, backward movement direction of the vehicle), etc.

For example, if the second element, the first element, and the third element are arranged in this order in the axial direction, then the first element is located between the second element and the third element when viewed from the radial direction. If the first element is shown as being between the second element and the third element when viewed from a prescribed direction in the drawings, it may be assumed that there is text in the description in the specification describing the first element between the second element and the third element when viewed from the prescribed direction.

If two elements (parts, sections, etc.) overlap when viewed from the axial direction, then the two elements are coaxial.

"Axial direction" means the axial direction of the axis of rotation of a part making up the device. "Radial direction" means a direction orthogonally intersecting the axis of rotation of the part making up the device. "Circumferential direction" means a circumferential direction about the axis of rotation of a part making up the device. The part is, for example, a motor, a gear mechanism, etc.

FIG. 1 is a diagram illustrating an automatic transmission case 4.

Figure 2:
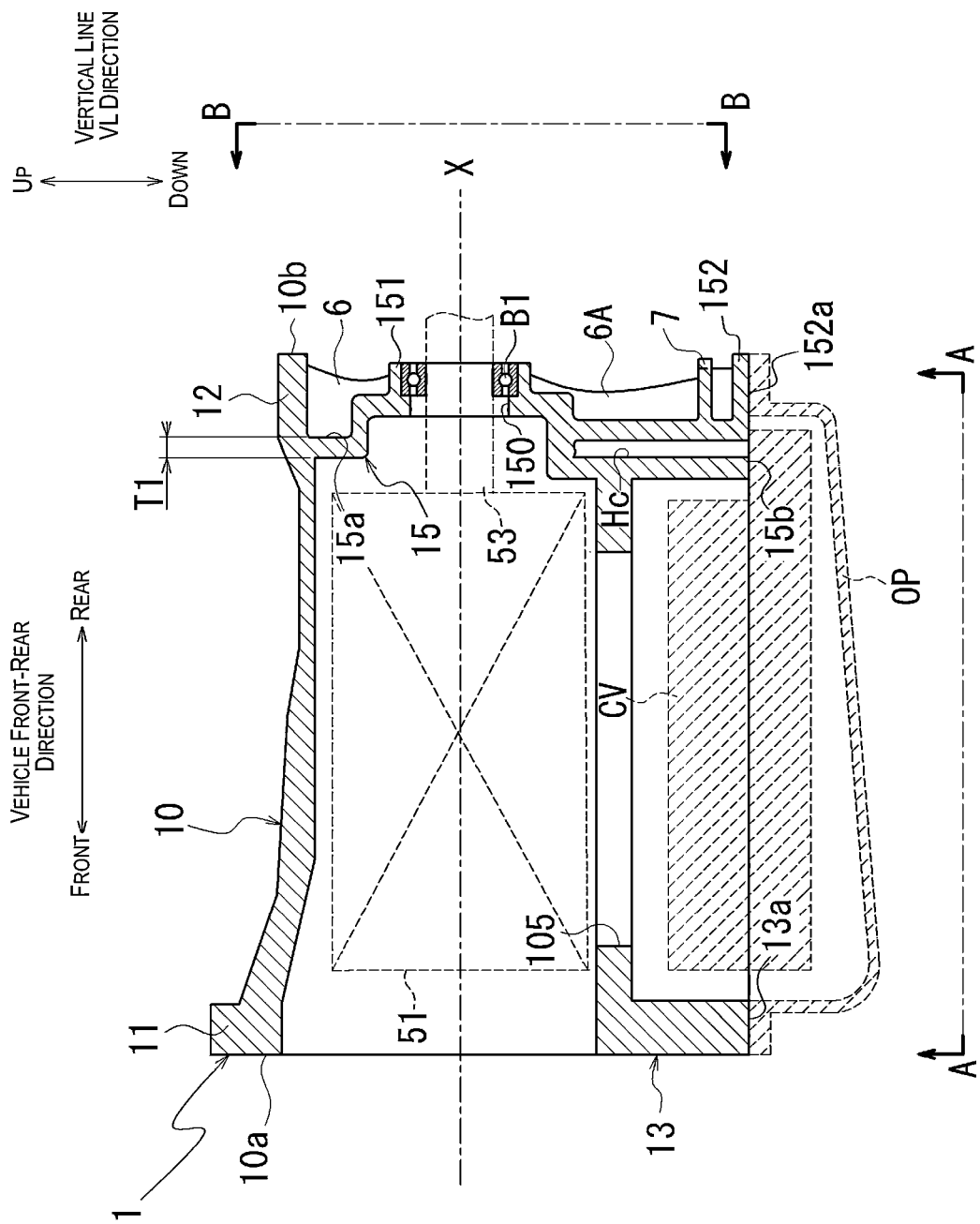
FIG. 2 is a diagram illustrating a transmission case.

FIG. 2 is a diagram illustrating a transmission case 1. In FIG. 2, the transmission case 1 is shown in cross section, with a transmission 51, an output shaft 53, a control valve CV, and an oil pan OP indicated by dashed lines.

Figure 3:
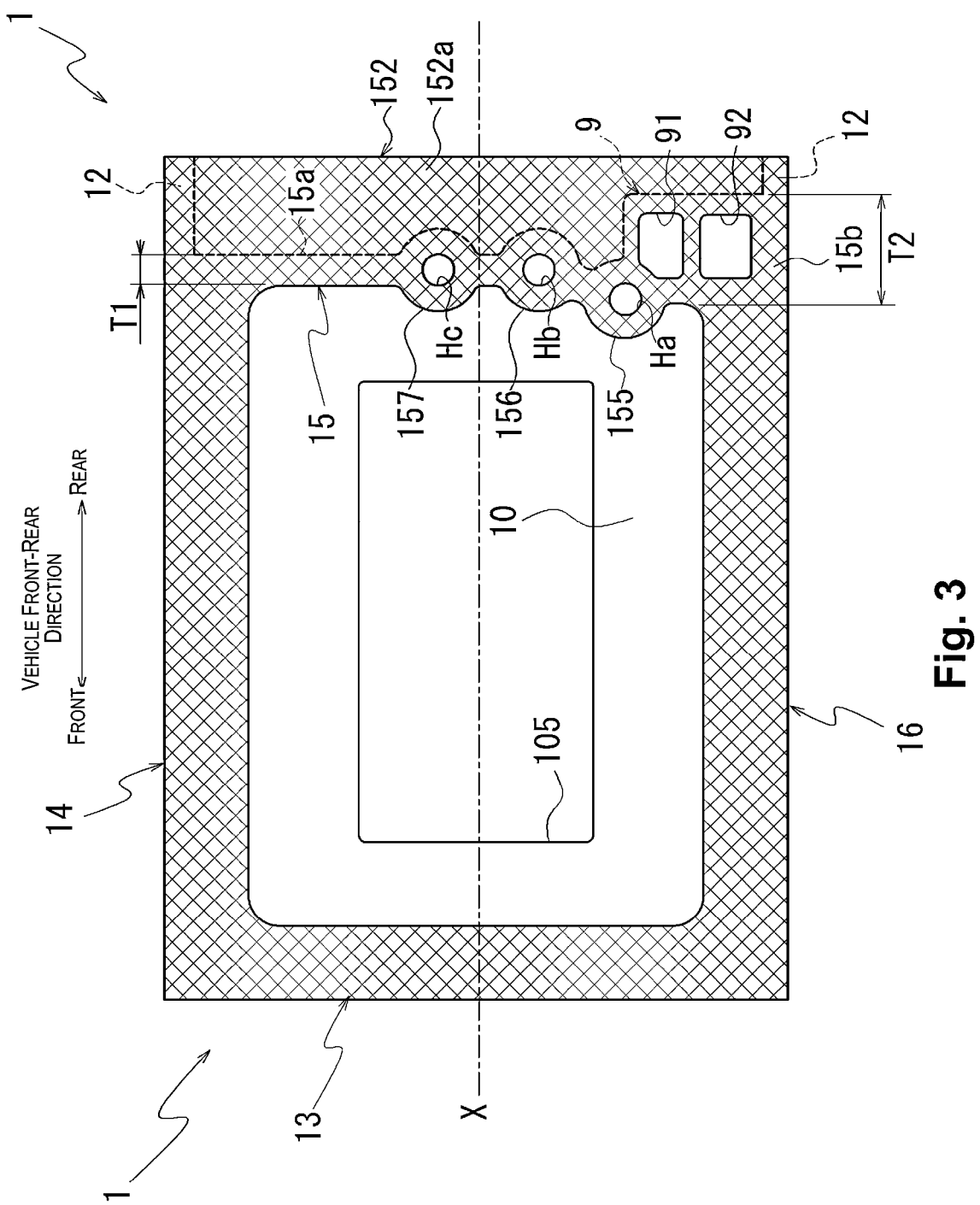
FIG. 3 is a diagram illustrating a transmission case.

FIG. 3 is a diagram illustrating the transmission case 1. FIG. 3 is a view along line A-A of FIG. 2. In FIG. 3, the surface where the control valve CV and the oil pan OP are joined is cross-hatched.

Figure 4:
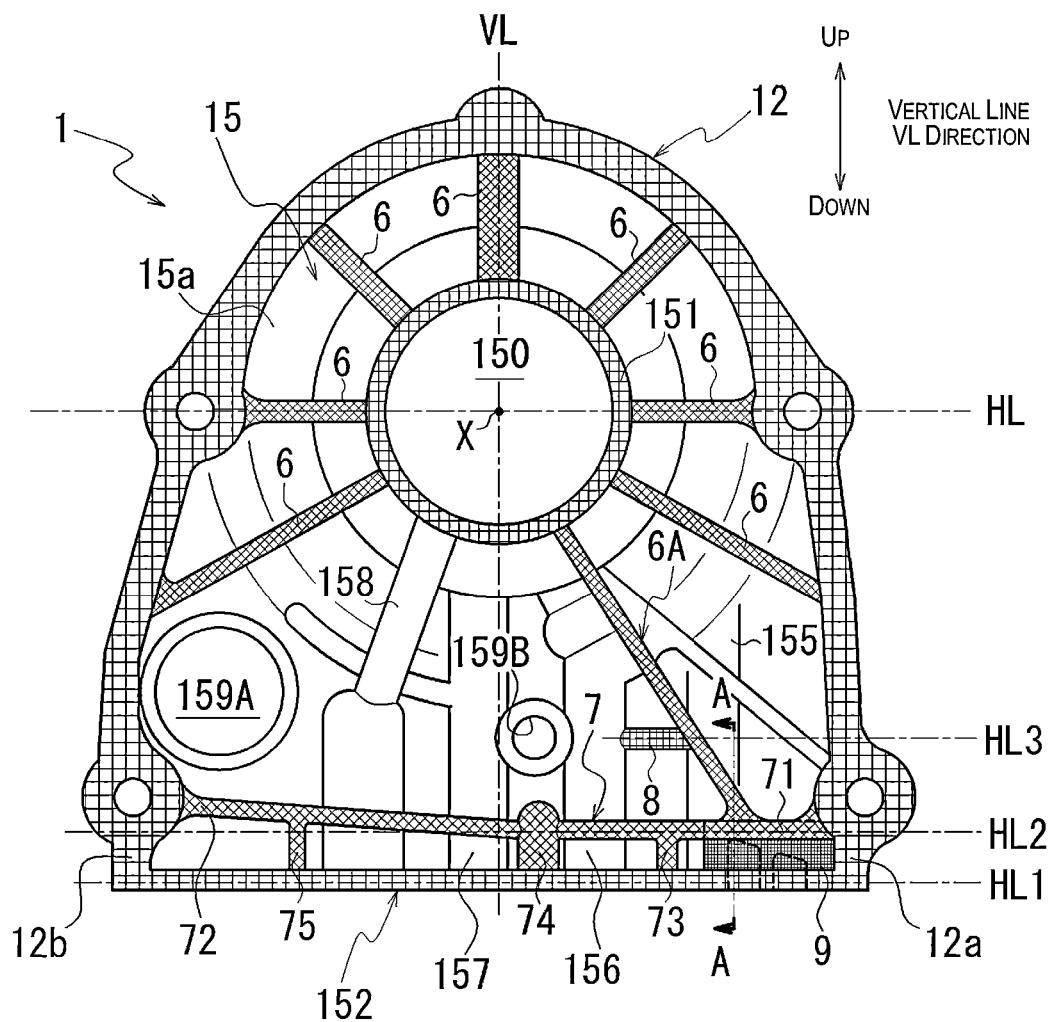
FIG. 4 is a diagram illustrating a transmission case.

FIG. 4 is a diagram illustrating the transmission case 1. FIG. 4 is a view along line B-B of FIG. 2. In FIG. 4, a shaft support section 151 and a joining section 12 are cross-hatched. Ribs 6, 7, 8 and a bulging section 9 are also cross-hatched.

Figure 5:
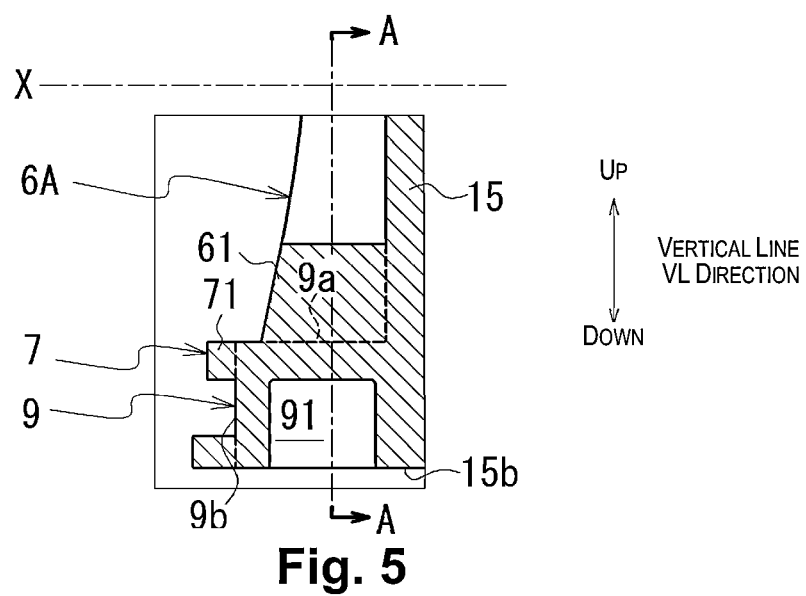
FIG. 5 is a diagram illustrating a transmission case.

FIG. 5 is a diagram illustrating the transmission case 1. FIG. 5 is a schematic diagram of cross section A-A in FIG. 4.

Figure 6:
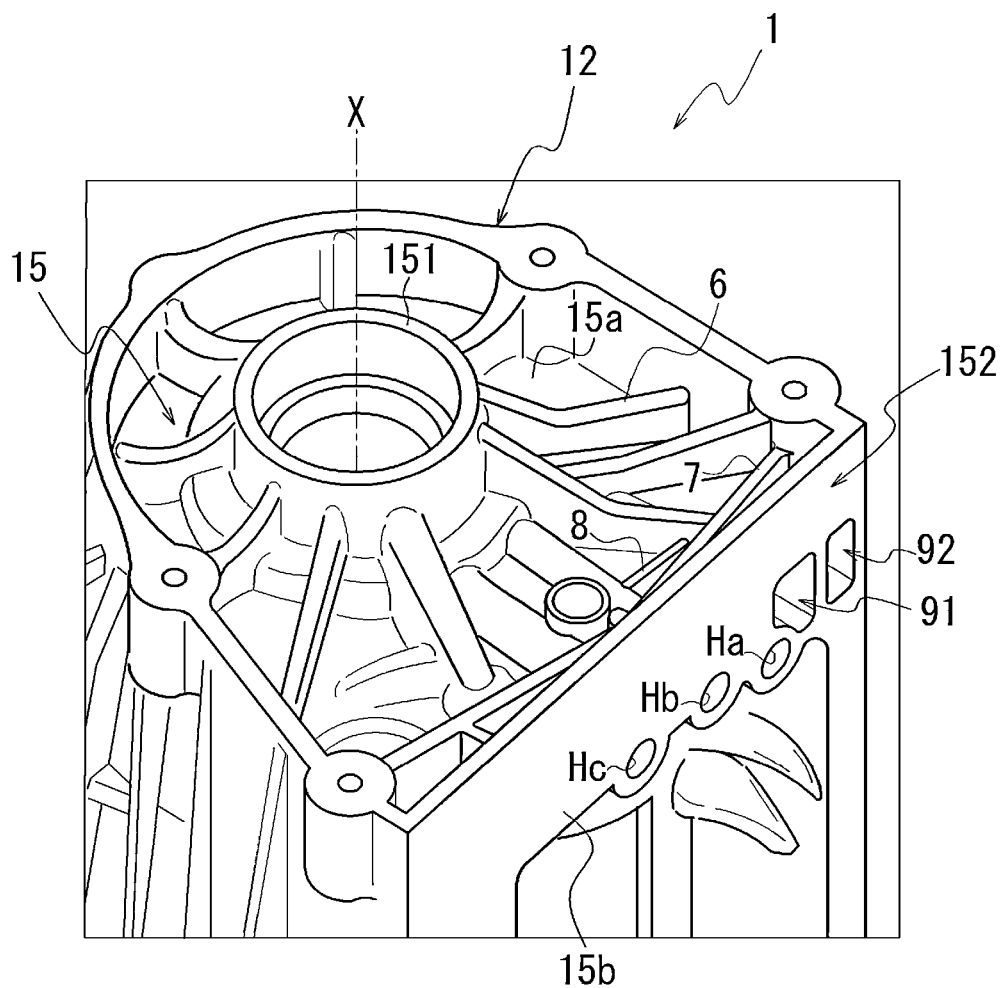
FIG. 6 is a diagram illustrating a transmission case.

FIG. 6 is a diagram illustrating the transmission case 1. FIG. 6 is a perspective view of the transmission case 1 as seen from the rear of the vehicle.

Figure 7:
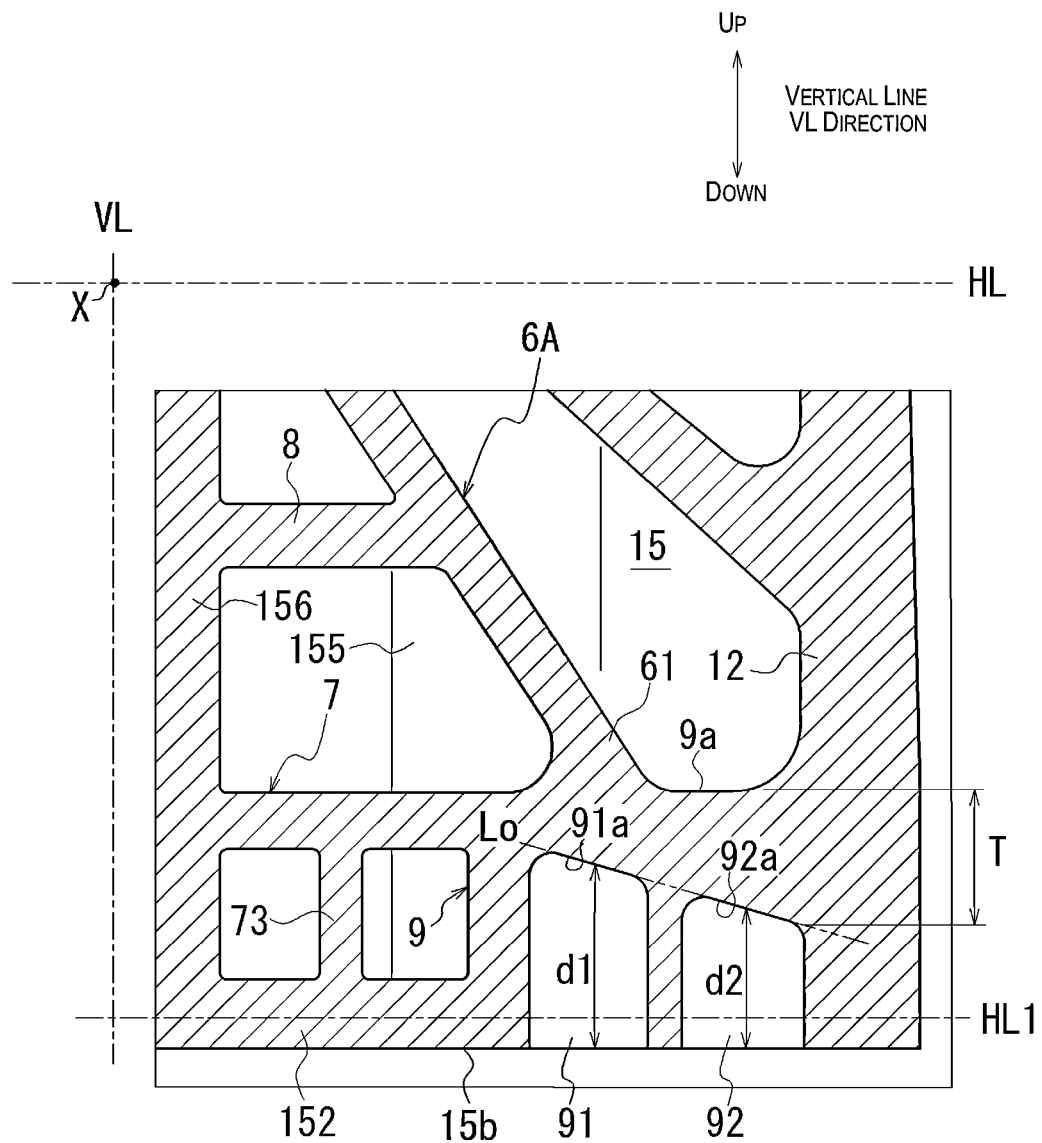
FIG. 7 is a diagram illustrating a transmission case.

FIG. 7 is a diagram illustrating the transmission case 1. FIG. 7 is a schematic diagram of cross section A-A of FIG. 5.

In the figures, the directions of vertical line VL and horizontal line HL are based on the installed state of the transmission case 1.

As shown in FIG. 1, the automatic transmission case 4 accommodates a torque converter 50, which is a driving force transmission device 5, an input shaft 52, the transmission 51, and the output shaft 53 (shaft) (see dashed lines in FIG. 1).

In the driving force transmission device 5, the torque converter 50, the input shaft 52, the transmission 51, and the output shaft 53 are provided along the transmission path of the output rotation around axis of rotation X of an engine (not shown). The driving force transmission device 5 is mounted in the vehicle with the axis of rotation X aligned in the front-rear direction of the vehicle. The axis of rotation X constitutes the axial center of the output shaft 53.

In the driving force transmission device 5, the output rotation of the engine is transmitted from the torque converter 50 to the transmission 51 via the input shaft 52. The output rotation transmitted to the transmission 51 is shifted by changing the engagement/release combinations of a plurality of frictional engagement elements (not shown) making up the transmission 51. The output rotation shifted by the transmission 51 is transmitted to the drive wheels of the vehicle, not shown, via the output shaft 53.

As shown in FIG. 1, the automatic transmission case 4 is oriented in the direction of the axis of rotation X. The automatic transmission case 4 is fixed to a member MB of the vehicle by a bracket 3.

The automatic transmission case 4 has a converter housing 2 and the transmission case 1. The converter housing 2 accommodates the torque converter 50. The transmission case 1 accommodates the transmission 51. The converter housing 2 and the transmission case 1 are arranged in that order from the front side of the vehicle to the rear side of the vehicle in the direction of the axis of rotation X.

The oil pan OP, which collects lubricating oil (not shown), is fixed to the bottom of the transmission case 1 in the direction of the vertical line VL (the vertical direction in the figure), based on the installation of the automatic transmission case 4 in the vehicle.

The transmission case 1 has a cylindrical wall section 10 surrounding the axis of rotation X.

The cylindrical wall section 10 has joining sections 11, 12 at one end 10a side (vehicle front side) and the other end 10b side (vehicle rear side) in the direction of the axis of rotation X.

The joining section 11 abuts a joining section 20 of the converter housing 2 from the direction of the axis of rotation X. The joining sections 11, 20 are connected to each other by bolts B.

A joining section 30 of the bracket 3 abuts the joining section 12 from the direction of the axis of rotation X. The joining section 12 of the transmission case 1 and the joining section 30 of the bracket 3 are connected to each other by the bolts B.

As shown in FIG. 2, at the other end 10b side of the cylindrical wall section 10, a wall section 15 extending radially inward is provided. The wall section 15 is provided in a direction intersecting the axis of rotation X.

The cylindrical wall section 10 accommodates the transmission 51 (see dashed lines in the figure) within an internal space from the wall section 15 in the direction of the axis of rotation X toward the one end 10a side. In the cylindrical wall section 10, a region farther toward the other end 10b side than the wall section 15 in the direction of the axis of rotation X serves as the joining section 12 with the bracket 3 (see FIG. 1).

The wall section 15 bulges in a direction approaching in a step-wise manner the other end 10b side of the cylindrical wall section 10 in the direction of the axis of rotation X from radially outward to radially inward. The thickness of the wall section 15 in the direction of the axis of rotation X is set to T1.

The wall section 15 has a through-hole 150 formed in the region intersecting the axis of rotation X. The output shaft 53 (see dashed lines in the figure) passes through the through-hole 150. The output shaft 53 crosses the wall section 15 from the front side of the vehicle to the rear side.

The wall section 15 is provided with the shaft support section 151 surrounding the through-hole 150. The shaft support section 151 is provided on a surface 15a on the vehicle rear side (right side of figure) of the wall section 15.

The shaft support section 151 forms an annular shape as viewed from the rear vehicle side (direction of line B-B in FIG. 2) in the direction of the axis of rotation X (see FIG. 4). In other words, the shaft support section 151 constitutes an annular section.

In the following description, "when seen from the vehicle rear side in the direction of the axis of rotation X" shall simply be described as "when seen from the direction of the axis of rotation X."

As shown in FIG. 2, bearings B1 are provided on the inner circumference of the shaft support section 151. The outer circumference of the output shaft 53 is supported by the shaft support section 151 via the bearings B1.

As shown in FIG. 2, a communication hole 105 that communicates between the inside and outside of the cylindrical wall section 10 is formed in the bottom of the cylindrical wall section 10 in the direction of the vertical line VL. The wall section 15 extends farther down than the communication hole 105 in the direction of the vertical line VL. Oil paths Ha-Hc, which will be described below, open in a bottom end surface 15b of the wall section 15 in the direction of the vertical line VL (see FIG. 3).

A flange section 152 is provided at the bottom end surface 15b of the wall section 15. The flange section 152 protrudes in the direction of the axis of rotation X from the surface 15a of the wall section 15. A bottom end surface 152a of the flange section 152 in the direction of the vertical line VL is coplanar with the bottom end surface 15b of the wall section 15 (in the following description, the bottom end surface 152a of the flange section 152 and the bottom end surface 15b of the wall section 15 shall simply be described as the bottom end surface 15b of the wall section 15).

A wall section 13 is provided on the one end 10a side of the cylindrical wall section 10. The wall section 13 extends farther down than the communication hole 105 in the direction of the vertical line VL. In the direction of the vertical line VL, a bottom end surface 13a of the wall section 13 is coplanar with the bottom end surface 15b of the wall section 15.

As shown in FIG. 3, the wall sections 13, 15 are provided in the direction along the radial direction of the axis of rotation X when the transmission case 1 is seen from below in the direction of the vertical line VL. The end sections of the wall sections 13, 15 are connected by connecting walls 14, 16, respectively. The connecting walls 14, 16 are provided in the direction along the axis of rotation X. The wall section 13, the wall section 15, the connecting wall 14, and the connecting wall 16 constitute a continuous wall surrounding the communication hole 105.

The oil pan OP (see dashed lines in FIG. 2) is connected to the wall section 13, the wall section 15, the connecting wall 14, and the connecting wall 16 from below in the direction of the vertical line VL.

As shown in FIG. 2, the control valve CV is accommodated in the space between the oil pan OP and the transmission case 1 in the direction of the vertical line VL (see the dashed lines and FIG. 2).

As shown in FIG. 3, the three oil paths Ha, Hb, Hc open in the bottom end surface 15b of the wall section 15. The oil paths Ha, Hb, Hc are arranged in the radial direction of the axis of rotation X.

As shown in FIG. 2, the oil path Hc extends through the inside of the wall section 15 in the direction of the vertical line VL. The bottom end of the oil path Hc in the direction of the vertical line VL communicates with an oil path (not shown) provided in the control valve CV. The top end of the oil path Hc communicates with an oil path (not shown) inside the case passing through the transmission case 1. It should be noted that FIG. 2 shows the oil path Hc, but the oil paths Ha, Hb are the same.

As shown in FIG. 3, thick portions 155, 156, 157 that have increased thickness in the direction of the axis of rotation X are provided in the region of the wall section 15 through which the oil paths Ha, Hb, Hc pass.

As shown in FIG. 3, as viewed from below in the direction of the vertical line VL, a bulging section 9 is provided on the radially outward side of the thick portion 155 in the wall section 15 in the radial direction of the axis of rotation X. The bulging section 9 bulges in the direction of the axis of rotation X from the surface 15a of the wall section 15. The thickness T2 of the bulging section 9 in the direction of the axis of rotation X is greater than the thickness T1 of the wall section 15 (T2>T1). The bulging section 9 is provided straddling the thick portion 155 and the joining portion 12 in the radial direction of the axis of rotation X. It should be noted that, as will be described in detail below, a rib 6A and a rib 7 are connected to the bulging section 9 (see FIG. 4). The bulging section 9 is provided to enhance the strength and rigidity of the ribs 6A and the rib 7.

As shown in FIG. 4, the thick sections 155, 156, 157 and the bulging section 9 bulge toward the viewer from the wall section 15 in the region below the horizontal line HL passing through the axis of rotation X.

Further, a thick section 158 is located adjacent to the thick section 157 in the wall section 15 in the circumferential section around the axis of rotation X. The thick section 158 also bulges from the wall section 15 outwardly from the plane of the paper.

The thick section 158 is provided in a region that extends in the radial direction of the axis of rotation X where the oil path (not shown), connecting the through-hole 150 and the accommodation space for the control valve CV (see FIG. 2), passes.

Further, a through-hole 159A is provided in a location adjacent to the thick section 158 in the wall section 15 in the circumferential direction around the axis of rotation X. A through-hole 159B is provided between the thick section 156 and the thick section 157 in the wall section 15. Electrical component harnesses, etc., which are not shown in the figure, pass through these through-holes 159A, 159B.

As shown in FIG. 4, when the transmission case 1 is viewed from the rear side of the vehicle, the joining section 12 forms an arcuate shape covering the shaft support section 151. One end section 12a and another end section 12b of the joining section 12 in the circumferential direction around the axis of rotation X are located below the horizontal line HL passing through the axis of rotation X. The one end section 12a and the other end section 12b of the joining section 12 connect to the flange section 152 of the wall section 15. The flange section 152 extends in a direction along a line HL1 that is parallel to the horizontal line HL passing through the axis of rotation X. As viewed from the direction of the axis of rotation X, the joining section 12 and the flange section 152 form a single continuous wall surrounding the shaft support section 151.

As shown in FIG. 4, the transmission case 1 has ribs 6, 7, 8 on the wall section 15 to increase the rigidity around the shaft support section 151.

[Ribs 6 (First Ribs)]

As shown in FIG. 4, a plurality of ribs 6 (first ribs) are provided between the joining section 12 and the shaft support section 151 in the radial direction of the axis of rotation X. The ribs 6 are provided with gaps therebetween in the circumferential direction around the axis of rotation X. The ribs 6 extend radially from the shaft support section 151. The ribs 6 are connected to the shaft support section 151 on the radially inward side and the radial direction of the axis of rotation X and are connected to the joining section 12 on the radially outward side in the radial direction of the axis of rotation X. The ribs 6 protrude in the direction of the axis of rotation X from the surface 15a of the wall section 15 (see FIG. 2).

In the present embodiment, the ribs 6 are not provided in those regions of the wall section 15 where the thick sections 156, 157, 158 and the through-hole 159A are provided. Moreover, of the plurality of ribs 6, a rib 6A, which is located closest to the thick section 156, is connected to the shaft support section 151 and the bulging section 9. As shown in FIG. 5, one end section 61 of the rib 6A is connected to a top surface 9a of the bulging section 9 in the direction of the vertical line VL.

[Rib 7 (Second Rib)]

As shown in FIG. 4, a rib 7 (second rib) is provided between the flange section 152 and the rib 6A in the direction of the vertical line VL in the wall section 15. As shown in FIG. 4, the vertical line VL is a straight line that passes through the axis of rotation X.

The rib 7 extends in the direction along line HL2 that is parallel to the horizontal line HL and crosses the vertical line VL that passes through the axis of rotation X from one side to the other. Specifically, the rib 7 is provided crossing the region of the wall section 15 where the thick sections 156, 157, 158 are provided in the direction of the straight line HL2.

One end section 71 and another end section 72 of the rib 7 are connected to the one end section 12a and the other end section 12b of the joining section 12, respectively.

As shown in FIG. 5, the one end section 71 of the rib 7 is also connected to the bulging section 9. The one end section 71 of the rib 7 is connected to a side surface 9b of the bulging section 9 in the direction of the axis of rotation X. Further, the rib 7 protrudes from the surface 15a of the wall section 15 in the direction of the axis of rotation X (see FIG. 2).

As shown in FIG. 4, the rib 7 has three branching ribs 73, 74, 75. The branching ribs 73, 74, 75 are arranged with gaps therebetween in the direction of the straight line HL2. The three branching ribs 73, 74, 75 extend downward in the direction of the vertical line VL from the rib 7 and connect to the flange section 152. In the present embodiment, of the three branching ribs 73, 74, 75, the branching rib 74 that is located in the middle is formed to be wider than the rib 7.

[Rib 8 (Third Rib)]

As shown in FIG. 4, a rib 8 (third rib) is provided between the rib 7 and the shaft support section 151 in the direction of the vertical line VL. The rib 8 branches off the rib 6A between the bulging section 9 and the shaft support section 151. The rib 8 extends in the direction of a straight line HL3 that is parallel to the horizontal line HL and is connected to the thick section 156. The rib 8 protrudes from the surface 15a of the wall section 15 in the direction of the axis of rotation X (see FIG. 6).

[Bulging Section 9]

As shown in FIG. 3, two recesses 91, 92 are provided inside the bulging section 9. These recesses 91, 92 are holes that reduce mass for decreasing the weight of the bulging section 9.

As shown in FIG. 7, the recesses 91, 92 are arranged in the direction of the straight line HL1. The recesses 91, 92 are adjacent to each other in the direction of the straight line HL1. In the direction of the straight line HL1, the recess 92 is provided in a position farther from the vertical line VL that passes through the axis of rotation X than the recess 91.

As shown in FIG. 7, the recess 91 opens in the bottom end surface 15b of the wall section 15 and is recessed to a depth d1 upward in the direction of the vertical line VL from the bottom end surface 15b. A bottom surface 91a of the recess 91 is sloped in a such a manner that the depth d1 decreases with increasing distance from the vertical line VL (i.e., approaches the bottom end surface 15b).

The recess 92 opens in the bottom end surface 15b of the wall section 15 and is recessed to a depth d2 upward in the direction of the vertical line VL from the bottom end surface 15b. The depth d2 of the recess 92 is set to be less than the depth d1 of the recess 91. A bottom surface 92a of the recess 92 is sloped in such a manner that the depth d2 decreases with increasing distance from the vertical line VL (i.e., approaches the bottom end surface 15b). As viewed from the direction of the axis of rotation X, the bottom surface 92a of the recess 92 is located below the bottom surface 91a of the recess 91.

The bottom surface 91a of the recess 91 and the bottom surface 92a of the recess 92 are sloped along a common straight line Lo. The straight line Lo is sloped in a direction so as to approach the bottom end surface 15b with increasing distance from the vertical line VL. As seen from the direction of the axis of rotation X, the bulging section 9 is formed so that a thickness T between the top surface 9a on the one hand and the bottom surfaces 91a, 92a on the other increases with increasing distance from the vertical line VL.

Casting of the transmission case 1 is described below.

Figure 8:
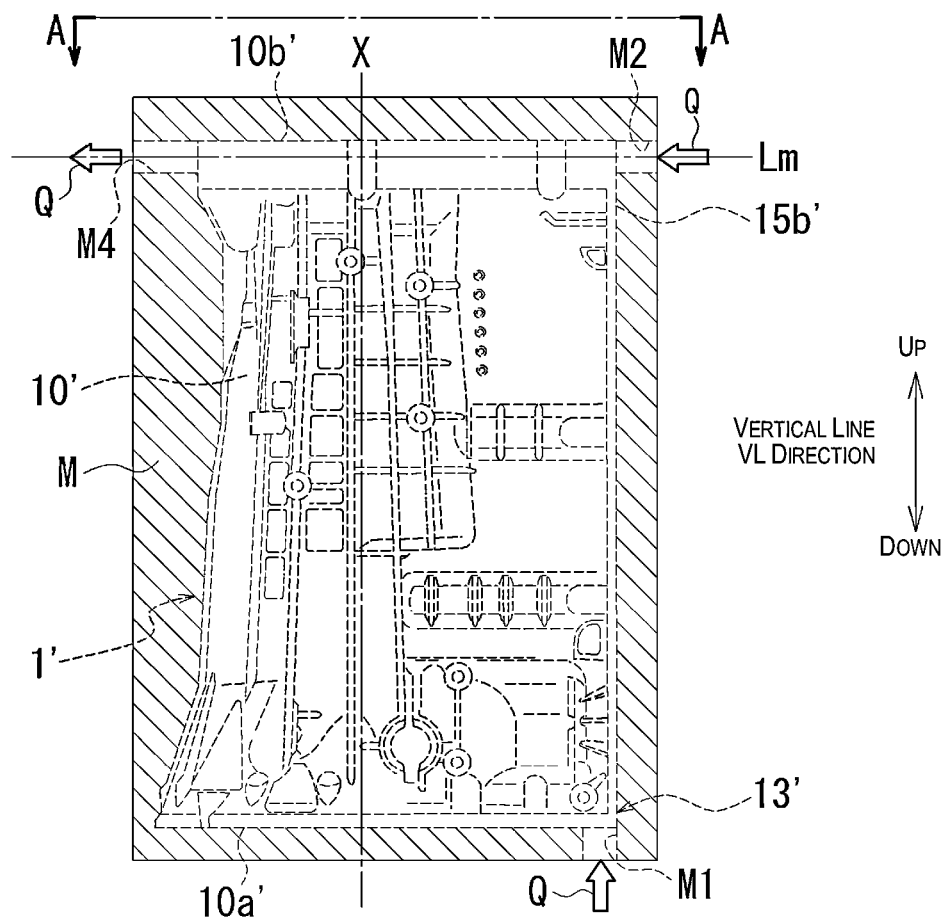
FIG. 8 is a diagram illustrating a casting mold.

FIG. 8 is a diagram illustrating the casting mold used in casting the transmission case 1.

Figure 9:
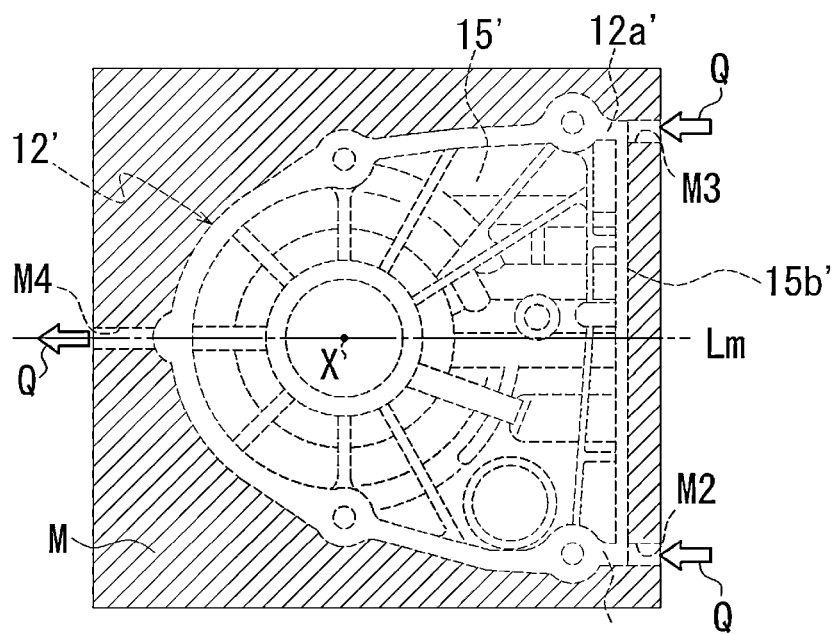
FIG. 9 is a diagram illustrating a casting mold.

FIG. 9 is a diagram illustrating the casting mold used in casting the transmission case 1. FIG. 9 is a view along line A-A of FIG. 8.

Figure 10:
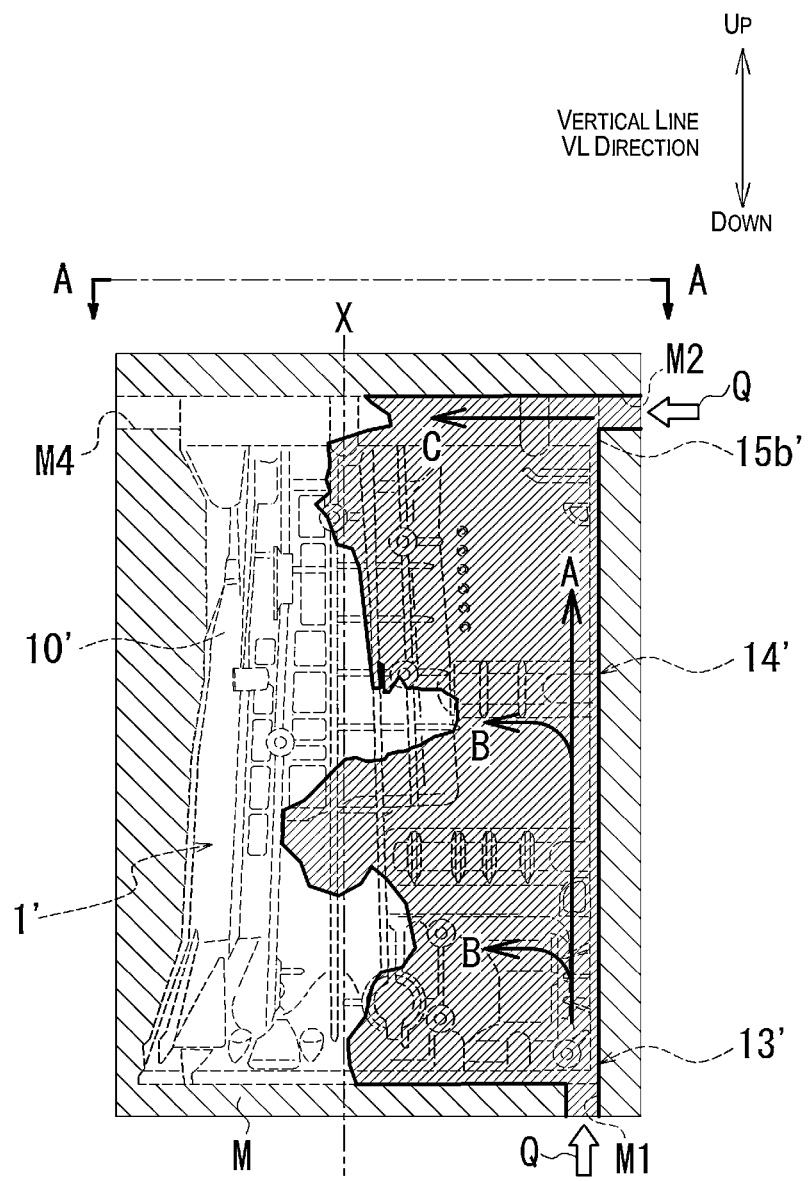
FIG. 10 is a diagram illustrating the flow of molten metal within a casting mold.

FIG. 10 is a diagram illustrating the flow of molten metal Q inside the casting mold M.

Figure 11:
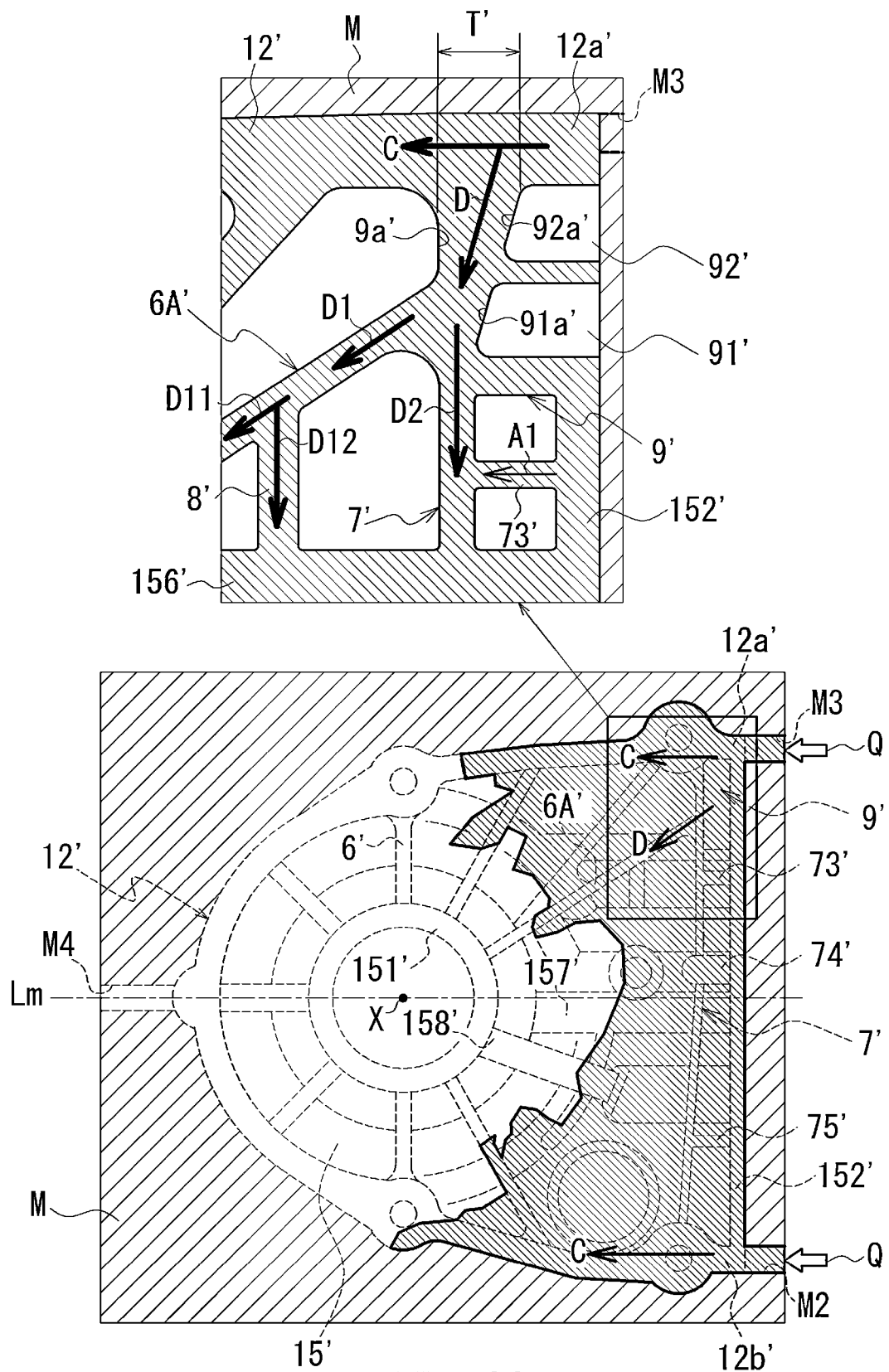
FIG. 11 is a diagram illustrating the flow of molten metal within a casting mold.

FIG. 11 is a diagram illustrating the flow of the molten metal Q inside the casting mold M. FIG. 11 is a view along line A-A of FIG. 10.

Figure 12:
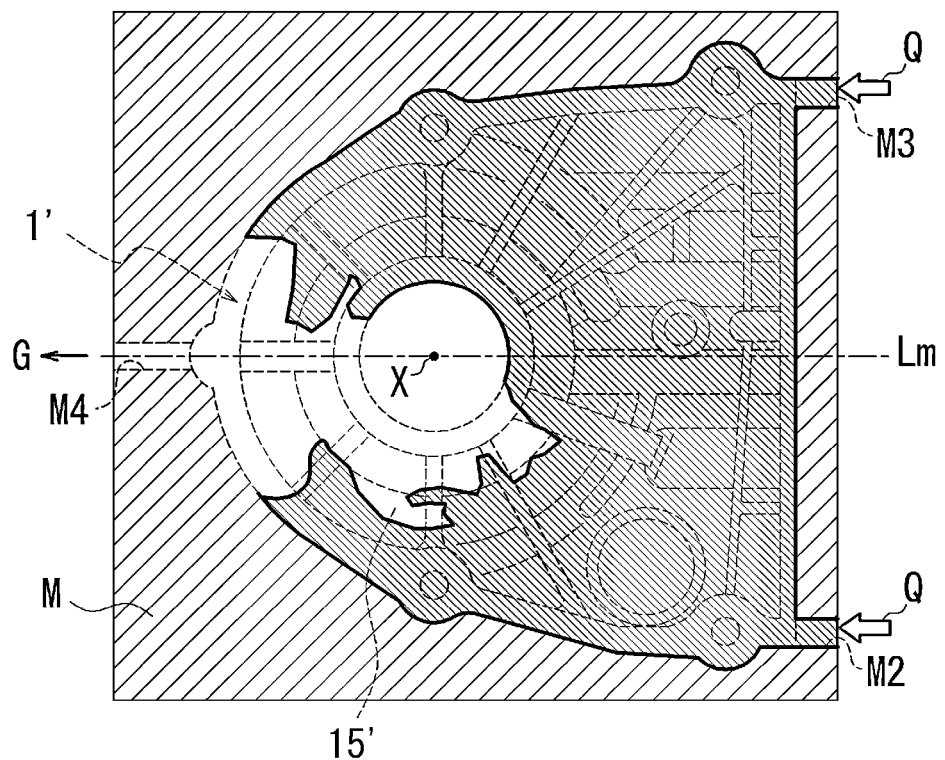
FIG. 12 is a diagram illustrating the flow of molten metal within a casting mold.
Figure 13:
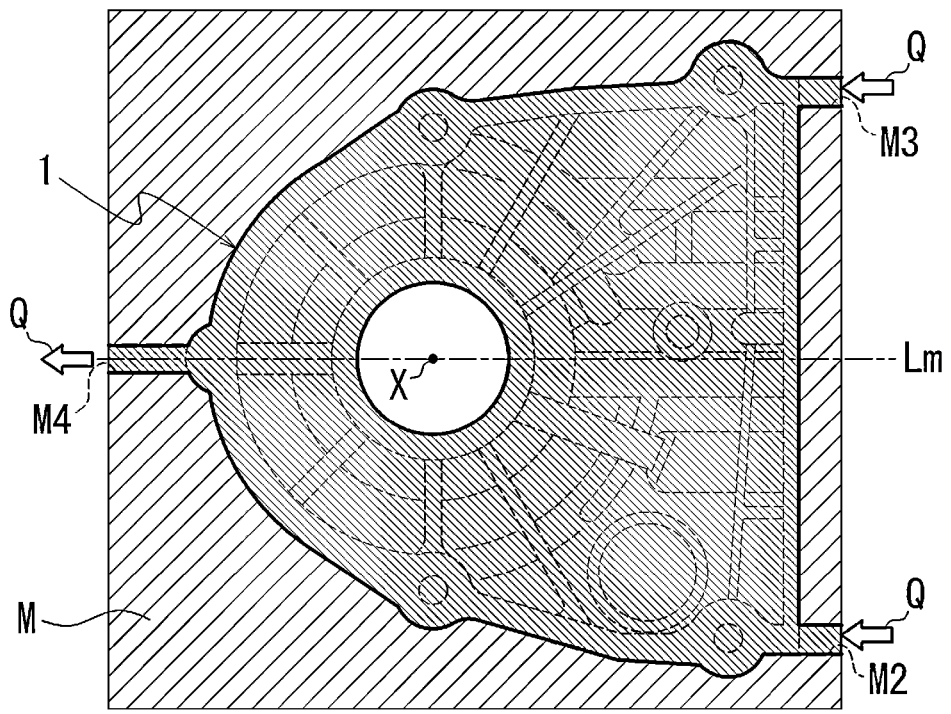
FIG. 13 is a diagram illustrating the flow of molten metal within a casting mold.

FIGS. 12 and 13 are diagrams sequentially illustrating the flow of the molten metal Q inside the casting mold M.

In FIGS. 8 to 13, the internal space in the casting mold M corresponding to the shape of the transmission case 1 is indicated by dashed lines. In FIGS. 10 to 13, the regions where the molten metal Q is supplied inside the casting mold M are hatched.

Casting is used to manufacture the transmission case 1 by pouring the molten metal Q into the casting mold M. The composition of the molten metal Q is a magnesium alloy.

The casting mold M has an internal space (transmission case 1', see the dashed lines in FIGS. 8 and 9) corresponding to the shape of the transmission case 1. In the following description, the parts of the internal space in the casting mold M that correspond to the respective parts of the transmission case 1 are indicated by the addition of "'" to the reference numerals.

As shown in FIG. 8, the casting mold M is arranged so that the axis of rotation X is aligned with the direction of the vertical line VL.

Specifically, the transmission case 1' is arranged so that the other end 10b' side of the cylindrical wall section 10' is at the top in the direction of the vertical line VL and the one end 10a' side is at the bottom in the direction of the vertical line VL.

As shown in FIGS. 8 and 9, the casting mold M is provided with three inlets M1, M2, M3 for the molten metal Q, and one outlet M4 for the molten metal Q. The inlets M1, M2, M3 and the outlet M4 are through-holes that connect the inside and outside of the casting mold M.

As shown in FIG. 8, the inlet M1 is connected to the wall section 13' on the bottom side (the one end 10a' side) of the casting mold M in the direction of the vertical line VL. The inlet M1 is provided in a direction along the axis of rotation X.

As shown in FIGS. 8 and 9, the inlets M2, M3 are connected to the bottom end surface 15b' of the wall section 15' on the top side (the other end 10b' side) of the casting mold M in the direction of the vertical line VL. The inlets M2, M3 are provided in the same position in the direction of the vertical line VL. The inlets M2, M3 are provided in a direction along a straight line Lm that intersects the axis of rotation X at a right angle.

As shown in FIG. 9, as viewed from the top in the direction of the vertical line VL, the inlet M2 is connected to the other end section 12b' side of the joining section 12'. The inlet M3 is connected to the one end section 12a' side of the joining section 12'.

As shown in FIG. 8, the outlet M4 is provided on the top side (the other end 10b' side) of the casting mold M in the direction of the vertical line VL opposite the inlets M2, M3 across the axis of rotation X. The outlet M4 is provided along the straight line Lm.

Specifically, as shown in FIG. 9, the outlet M4 is connected at the intersection of the joining section 12' and the straight line Lm. It should be noted that, as shown in FIGS. 8 and 9, a case in which the casting mold M has the three inlets M1, M2, M3 for the molten metal Q was described as an embodiment of the present invention, but the present invention is not limited to the aspect shown in the embodiments, and one or more additional inlets may be provided between the inlet M1 and the inlet M2 and between the inlet M1 and the inlet M3, depending on the casting requirements.

Operation during casting of the transmission case 1 having this configuration shall now be described.

As shown in FIGS. 10 and 11, the molten metal Q is injected through the inlets M1-M3 into the space inside the casting mold M (the transmission case 1'). Most of the molten metal Q first flows in a direction along the direction of injection of the molten metal Q through the transmission case 1'. The enlarged view in FIG. 11 shows the region corresponding to the cross section A-A of FIG. 5 of the space inside the casting mold M.

As shown in FIG. 10, most of the molten metal Q injected from the inlet M1 flows into the wall section 13' and then passes through the connecting wall 14' and flows along the axis of rotation X (arrow A). The area around the wall section 13' and the connecting wall 14' is thereby filled with the molten metal Q. Thereafter, the molten metal Q can flow from the wall section 13' and the connecting wall 14' toward the cylindrical wall section 10' in the radial direction of the axis of rotation X (arrow B).

Although not shown in the figures, the molten metal Q flowing into the wall section 13' also flows toward the connecting wall 16' (see FIG. 3). In the connecting wall 16', the flow is the same as in the connecting wall 14' (arrows A and B in FIG. 10).

Further, as shown in FIG. 10, the molten metal Q that has been injected through the inlet M2 flows from the bottom end surface 15b' toward the cylindrical wall section 10' in the radial direction of the axis of rotation X (arrow C). In like fashion, the molten metal Q injected through the inlet M3 also flows in the direction of the arrow C (see FIG. 11).

As shown in FIG. 11, immediately after the molten metal Q is supplied through the inlets M2, M3, the molten metal first fills the area around the one end section 12a' and the other end section 12b' of the joining section 12'. Thereafter, the molten metal flows toward the bulging section 9', the wall section 15', the ribs 6', etc.

The joining section 12, the bulging section 9, and the ribs 6 are provided protruding from the wall section 15 in the direction of the axis of rotation X (see FIGS. 2 and 3). Therefore, the regions where the bulging section 9' and the ribs 6' are provided in the space inside the casting mold M (the transmission case 1') have a wider cross-sectional area as flow paths for the molten metal Q to flow through than the wall section 15'.

Thus, the molten metal Q filling the areas around the one end section 12a' and the other end section 12b' of the joining section 12' preferentially passes through the bulging section 9' and the ribs 6' more easily than the wall section 15' (arrows C and D in FIG. 11).

No portions equivalent to the ribs 6' are provided in the regions of the wall section 15' where the thick sections 157', 158' are provided.

Therefore, the supply speed of the molten metal Q in the regions around the fixed sections 157', 158' in the wall section 15' is slower than in the regions where the ribs 6' are provided. Therefore, as shown in FIG. 11, the regions of the molten metal Q inside the transmission case 1' around the thick sections 157', 158' in the wall section 15' are recessed in a direction away from the outlet M4 in the direction of the straight line Lm.

A gas G is emitted by the molten metal Q. The gas G is discharged through the outlet M4, pushed out by the molten metal Q which is progressively supplied into the casting mold M (see FIG. 12).

As will be described in detail below, if there is a difference (imbalance) in the speed with which the molten metal Q is supplied to the various parts of the casting mold M, the gas G might not be suitably expelled, resulting in castings with inclusions of the gas G (see FIG. 17). The trapped gas G creates cavities in the cast transmission case. The greater the difference in the speed with which the molten metal Q is supplied, the greater the tendency of forming cavities.

Therefore, in order to minimize the occurrence of differences (imbalance) in the speed with which the molten metal Q is supplied, the rib 6A is connected to the bulging section 9 in the transmission case 1 according to the present embodiment. Further, the bottom surface 91a of the recess 91 and the bottom surface 92a of the recess 92 in the bulging section 9 are sloped along a common straight line Lo. Thus, in the bulging section 9, the thickness T between the top surface 9a and the bottom surfaces 91a, 92a increases with increasing distance from the vertical line VL (see FIG. 7).

Therefore, as shown by the enlarged region in FIG. 11, in the casting mold M, the gap T' in the bulging section 9' between the top surface 9a' and the bottom surfaces 91a', 92a' of the recesses 91', 92' increases with increasing distance from the straight line Lm. Hence, the space between the top surface 9a' and the bottom surfaces 91a', 92a' of the recesses 91', 92' is greater on the joining section 12' side.

As shown by the enlarged region in FIG. 11, the molten metal Q filling the one end section 12a' of the joining section 12' through the inlet M3 in the casting mold M flows in the direction of the arrow C and also flows toward the bulging section 9'. In this case, since the space between the top surface 9a' and the bottom surfaces 91a', 92a' is greater on the joining section 12' side, most of the molten metal Q flows toward the bulging section 9' (the direction of arrow D).

The molten metal Q in the bulging section 9' is pushed by the molten metal Q progressively flowing from the one end section 12a' of the joining section 12' and moves from the recess 92' side toward the recess 91'. The molten metal Q that has moved toward the recess 91' further diverges and flows toward the rib 6A' and the rib 7' (arrows D1, D2).

The molten metal Q flowing through the rib 6A' along the arrow D1 is again diverged into a flow toward the shaft support section 151' (arrow D11) and a flow toward the rib 8' (arrow D12). The molten metal Q flowing through the rib 8' along the arrow D12 passes through the thick section 156' and reaches the thick sections 157', 158'.

The molten metal Q flowing through the rib 7' along the arrow D2 passes through the thick section 156' and reaches the thick sections 157', 158'.

The rib 7' is also connected to the flange section 152' via the branching ribs 73', 74', 75'. Part of the molten metal Q supplied through the inlet M1 (see FIG. 10) and moving in the direction of the arrow A reaches the flange section 152'. The molten metal Q that has reached the flange section 152' passes through the branching ribs 73', 74', 75' and is supplied to the rib 7' (arrow A1). Thus, more of the molten metal Q is supplied toward the thick sections 157', 158'.

In this way, by forming a flow of the molten metal Q oriented to approach the straight line Lm in this manner (arrows D, D2, D12), the supply of the molten metal Q to the areas around the thick sections 157', 158', which the molten metal Q would otherwise have difficulty reaching, can be promoted. The occurrence of differences (imbalances) in the supply speed of the molten metal Q is thereby reduced, and the gas G produced by the molten metal Q is progressively pushed toward the outlet M4. The occurrence of casting cavities in the transmission case 1 can thus be reduced (see FIGS. 12 and 13).

Comparative Example

Figure 14:
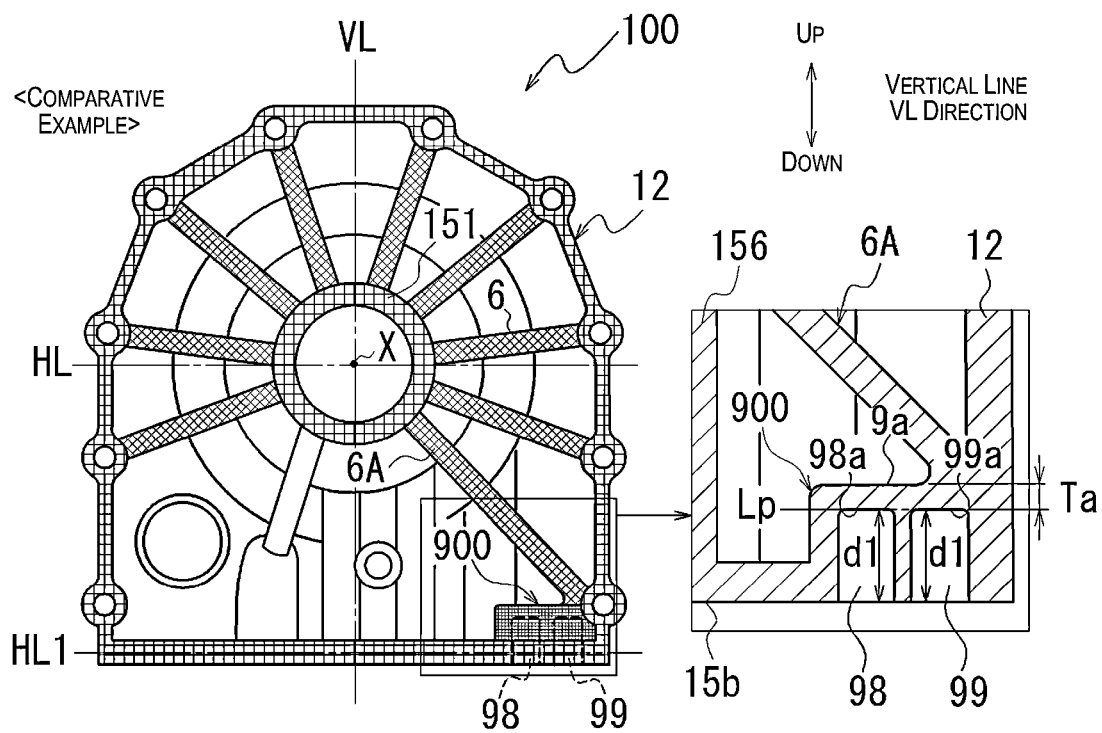
FIG. 14 is a diagram illustrating a transmission case according to a comparative example.

FIG. 14 is a diagram illustrating a transmission case 100 according to a comparative example.

Figure 15:
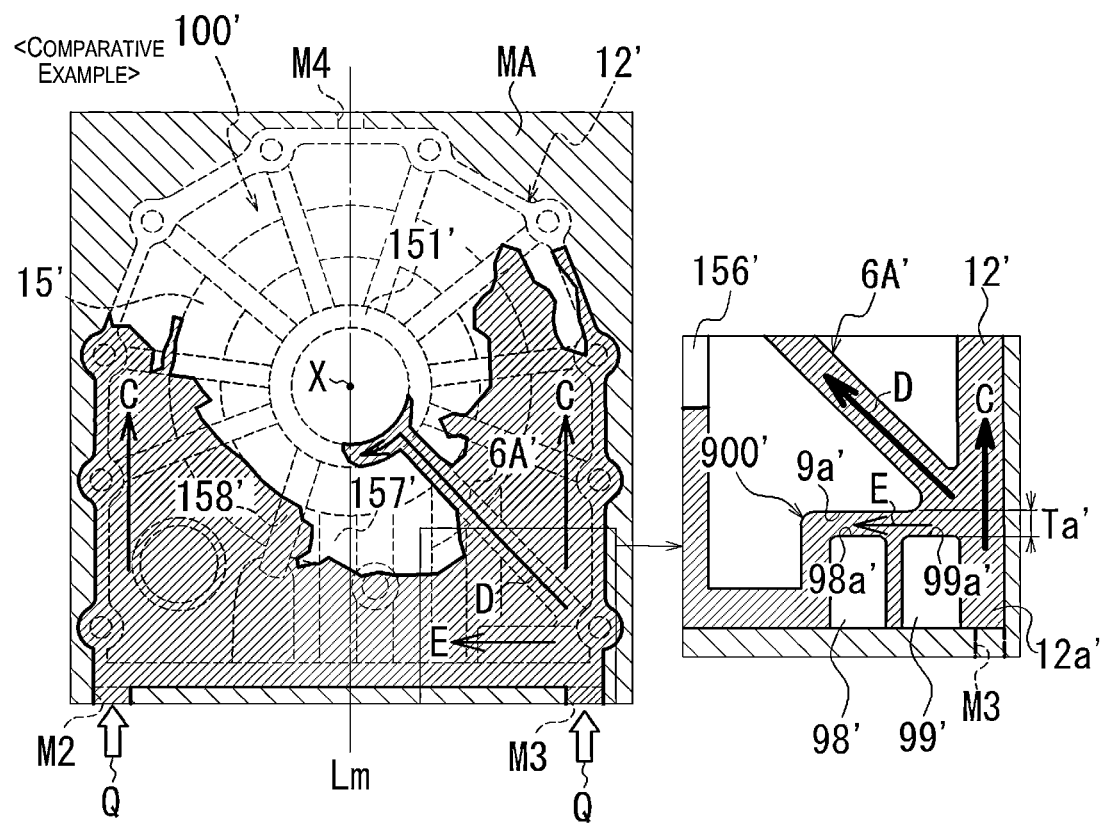
FIG. 15 is a diagram illustrating a transmission case according to a comparative example.
Figure 16:
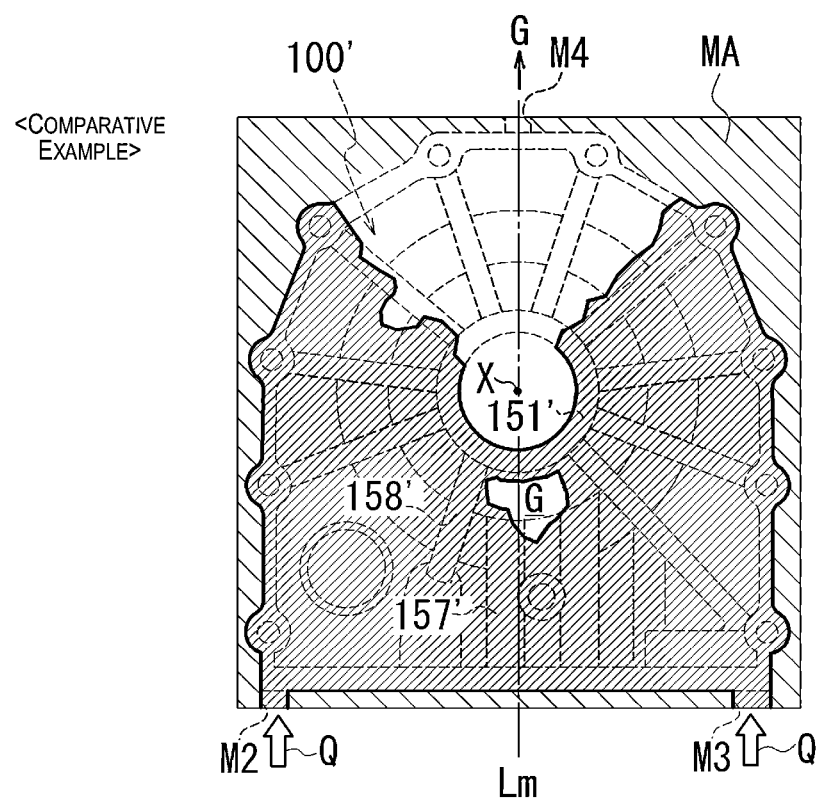
FIG. 16 is a diagram illustrating a transmission case according to a comparative example.
Figure 17:
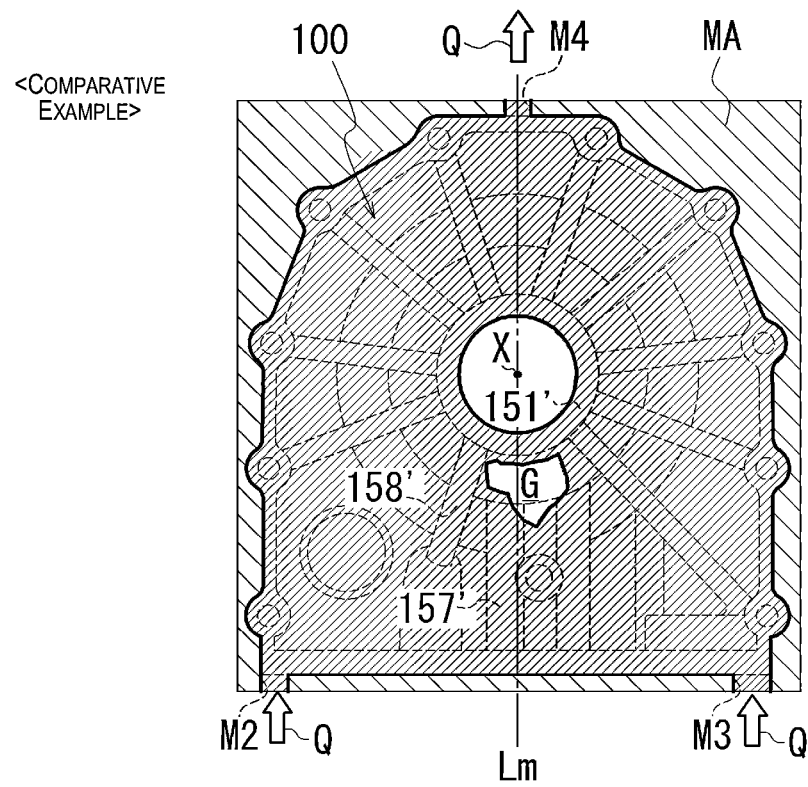
FIG. 17 is a diagram illustrating a transmission case according to a comparative example.

FIGS. 15 to 17 are diagrams illustrating the flow sequence of molten metal Q in a casting mold MA. In the following comparative example, only those sections that differ from the present embodiment are described.

As shown in FIG. 14, the transmission case 100 according to the comparative example differs from the present embodiment in not having the rib 7 and the rib 8. Two recesses 98, 99 are provided inside a bulging section 900. The comparative example differs from the present invention in that the two recesses 98, 99 are formed to have the same depth, as viewed from the direction of the axis of rotation X.

Specifically, the two recesses 98, 99 are recessed upward from the bottom end surface 15b in the direction of the vertical line VL to the same depth d1. Bottom surfaces 98a, 99a of the recesses 98, 99 are provided in a direction along a common straight line Lp. The straight line Lp is parallel to the horizontal line HL.

In the bulging section 900, a thickness Ta in the direction of the vertical line VL between a top surface 9a and the bottom surfaces 98a, 99a of the recesses 98, 99 is formed uniformly.

As shown in FIGS. 15 to 17, the transmission case 100 is formed by pouring the molten metal Q into the casting mold MA that has a space corresponding to the shape of the transmission case 100 (a transmission case 100', see the dashed lines in FIGS. 15 to 17).

As shown in the enlarged region in FIG. 15, the gap Ta' is uniform in the direction of the straight line Lm between the top surface 9a' of the bulging section 900' and the bottom surfaces 98a', 99a' in the casting mold MA. On the joining section 12' side, the gap Ta' of the bulging section 900' is narrower than the gap T' of the present embodiment (see FIG. 11) (Ta'<T').

In the casting mold MA, the molten metal Q filling the one end section 12a' of the joining section 12' through the inlet M3 flows in the direction of the arrow C and also flows to the rib 6A' and the bulging section 900' (the direction of the arrows D, E). However, the space between the top surface 9a' and the bottom surfaces 98a', 99a' of the recesses 98', 99' is not greater on the joining section 12' side, as in the present embodiment. Therefore, the amount of the molten metal Q flowing toward the bulging section 900' (the direction of the arrow E) is smaller, with a greater amount of the molten metal Q flowing to the rib 6A' (the direction of the arrow D).

Further, in the transmission case 100 according to the comparative example, the rib 7 and the rib 8 are not provided, so that it is more difficult than in the present embodiment to create a flow of the molten metal Q oriented to approach the straight line Lm from the bulging section 900' during casting. Therefore, in the transmission case 100' according to the comparative example, the molten metal Q is difficult to supply to the region around the thick sections 157', 158' in the wall section 15'.

As shown in FIG. 15, the molten metal Q flowing through the rib 6A' (arrow D) reaches the shaft support section 151' before the molten metal Q flowing through the building section 900' (arrow E) reaches the region around the thick sections 157', 158'.

Therefore, as shown in FIG. 16, the molten metal Q that has reached the shaft support section 151' first acts as a wall, and the gas G produced by the region around the thick sections 157', 158' is prevented from being pushed toward the outlet M4 in the direction of the straight line Lm. The gas G is thus trapped inside the casting mold MA. Therefore, the gas G left behind in the molten metal Q appears as cavities in the transmission case 100 after casting (see FIG. 17).

In contrast, as shown in FIG. 7, in the transmission case 1 according to the present embodiment, the depth d2 of the recess 92 inside the bulging section 9 is made shallower than the depth d1 of the recess 91 to make the joining section 12' side of the bulging section 9' larger in the casting mold M (see FIG. 11). This makes it easier to bring the molten metal Q into the bulging section 9'. Further, by providing the ribs 7, 8, molten metal Q can easily be supplied during casting to the thick sections 158, 157 where the ribs 6 are not provided.

The difference in the supply speed of the molten metal Q to the various parts inside the casting mold M is thereby reduced, making it possible to minimize entrainment of the gas G produced by the molten metal Q. The yield of the transmission case 1 is thereby improved.

In order to reduce the occurrence of casting cavities, it is conceivable to increase the volume of the bulging section 9 so that the bulging section 9 lacks the recesses 91, 92. However, in this case, the weight of the transmission case 1 would increase. In the present embodiment, providing the recesses 91, 92 reduces the occurrence of casting cavities and also results in a lighter transmission case 1.

In the present embodiment, a case was illustrated in which the two recesses 91, 92 were provided inside the bulging section 9, but the number of recesses is not limited to two. The transmission case 1 can be made lighter and the yield can be improved by providing at least either the recess 91 or the recess 92. There may, of course, also be three or more recesses.

Examples of transmission case 1 according to certain aspects of the present disclosure are given below.

(1) A transmission case 1 (the case) houses a transmission 51 of a driving force transmission device 5.

The transmission case 1 has a wall section 15 provided with a through-hole 150 through which an output shaft 53 passes that transmits driving force.

As viewed from the direction of the axis of rotation X of the output shaft 53, the wall section 15 is provided with a shaft support section 151 (annular section) surrounding the through-hole 150, a plurality of ribs 6 (first ribs) that extend radially outwardly from the shaft support section 151, and a rib 7 (second rib) crossing a vertical line VL passing through the axis of rotation X (axial center of the shaft) from one side to the other.

The wall section 15 is provided with a recess 92.

As viewed from the direction of the axis of rotation X, the recess 92 opens in a bottom end section 15b of the wall section 15.

The recess 92 is recessed in a direction along the vertical line VL.

As viewed from the direction of the axis of rotation X, a bottom surface 92a of the recess 92 has a shape such that the side away from the vertical line VL is located closer to the bottom end surface 15b in the direction of the vertical line VL.

The bulging section 9, which is a region of the wall section 15 in which the recess 92 is provided, is connected to one end section 71 of the rib 7.

With this configuration, a transmission case 1 can be provided that reduces the occurrence of casting cavities and improves yield.

Specifically, the bottom surface 92a of the recess 92 has a shape so as to be located closer to the bottom end surface 15b with increasing distance from the vertical line VL. Therefore, during casting, the molten metal Q easily passes into the bulging section 9'. Thus, it is possible to promote the supply of the molten metal Q from the bulging section 9' via the rib 7' to regions around the thick sections 157', 158' where the ribs 6' cannot be provided. The difference in the speed with which the molten metal Q is supplied to various parts inside the casting mold M can thereby be reduced. Hence, it is possible to reduce the occurrence of casting cavities caused by the entrainment of the gas G generated by the molten metal Q.

To reduce the occurrence of cavities, it is conceivable simply to increase the volume of the bulging section 9 by omitting the recess 92 from the bulging section. However, in this case, the weight of the transmission case 1 would be increased. In the present embodiment, providing the recess 92 makes it possible to reduce the occurrence of casting cavities and makes the transmission case 1 lighter.

(2) The bottom surface 92a of the recess 92 is a sloped surface that is sloped in a direction approaching the bottom end surface 15b with increasing distance from the vertical line VL.

Specifically, the bottom surface 92a of the recess 92 is provided oriented along the straight line Lo. The orientation of the straight line Lo is sloped to approach the bottom end surface 15b with increasing distance from the vertical line VL.

With this configuration, during casting, the molten metal Q can be directed toward the rib 7' smoothly without generating eddy currents in the bulging section 9'. Further, in the present embodiment, a case was described in which the entire bottom surface 92a of the recess 92 is sloped approaching the bottom end surface 15b, but it is also possible to form part of the bottom surface 92a to be sloped approaching the bottom end surface 15b.

(3) The recesses 91, 92 (a plurality of recesses) open in the bottom end surface 15b of the wall section 15 as viewed from the direction of the axis of rotation X.

As viewed from the direction of the axis of rotation X, the recesses 91, 92 are oriented along the straight line HL1 that intersects the vertical line VL. The recess 92 is provided in a location further away from the vertical line VL than the recess 91.

The bottom surface 92a of the recess 92 is located closer to the bottom end surface 15b than the bottom surface 91a of the recess 91.

By increasing the number of recesses, the transmission case 1 can be made lighter. Therefore, with the foregoing configuration, the transmission case 1 can be made lighter and the occurrence of cavities can be reduced.

(4) The recesses 91, 92 are adjacent in the direction of the straight line HL1 that intersects the vertical line VL.

The bottom surface 91a of the recess 91 and the bottom surface 92a of the recess 92 are sloped surfaces that are continuously sloped to approach the bottom end surface with increasing distance from the vertical line VL.

Specifically, the bottom surfaces 91a, 92a of the recesses 91, 92 are provided oriented along the straight line Lo. The straight line Lo is sloped to approach the bottom end surface 15b with increasing distance from the vertical line VL.

With this configuration, even if a plurality of recesses is provided, during casting the molten metal Q can be directed toward the rib 7' smoothly without the generation of eddy currents in the bulging section 9'.

(6) As Viewed from the Direction of the Axis of Rotation X, the Wall Section 15 has a Rib 8 (Third Rib) Between the Shaft Support Section 151 and the Rib 7 in the Direction of the Vertical Line VL.

The rib 8 branches off from the rib 6A of the plurality of ribs 6 and extends with an orientation approaching the vertical line VL.

One end section 61 of the rib 6A is connected to the bulging section 9.

With this configuration, part of the molten metal Q that has passed from the bulging section 9' through the rib 6A' can be supplied to the region around the thick sections 157', 158' via the rib 8'. Thus, it is possible to reduce the difference in supply speed of the molten metal Q to the various parts inside the casting mold M. The occurrence of casting cavities can be reduced due to the entrainment of the gas G generated by the molten metal Q.

Variants

In the foregoing embodiment, a case was illustrated in which the bottom surface 91a of the recess 91 and the bottom surface 92a of the recess 92 were sloped surfaces along a common straight line Lo, but this aspect is not a limitation. For example, the bottom surfaces of the recesses may be stepped. It should be noted that only those sections that differ from the present embodiment are described in the variant below.

Figure 18:
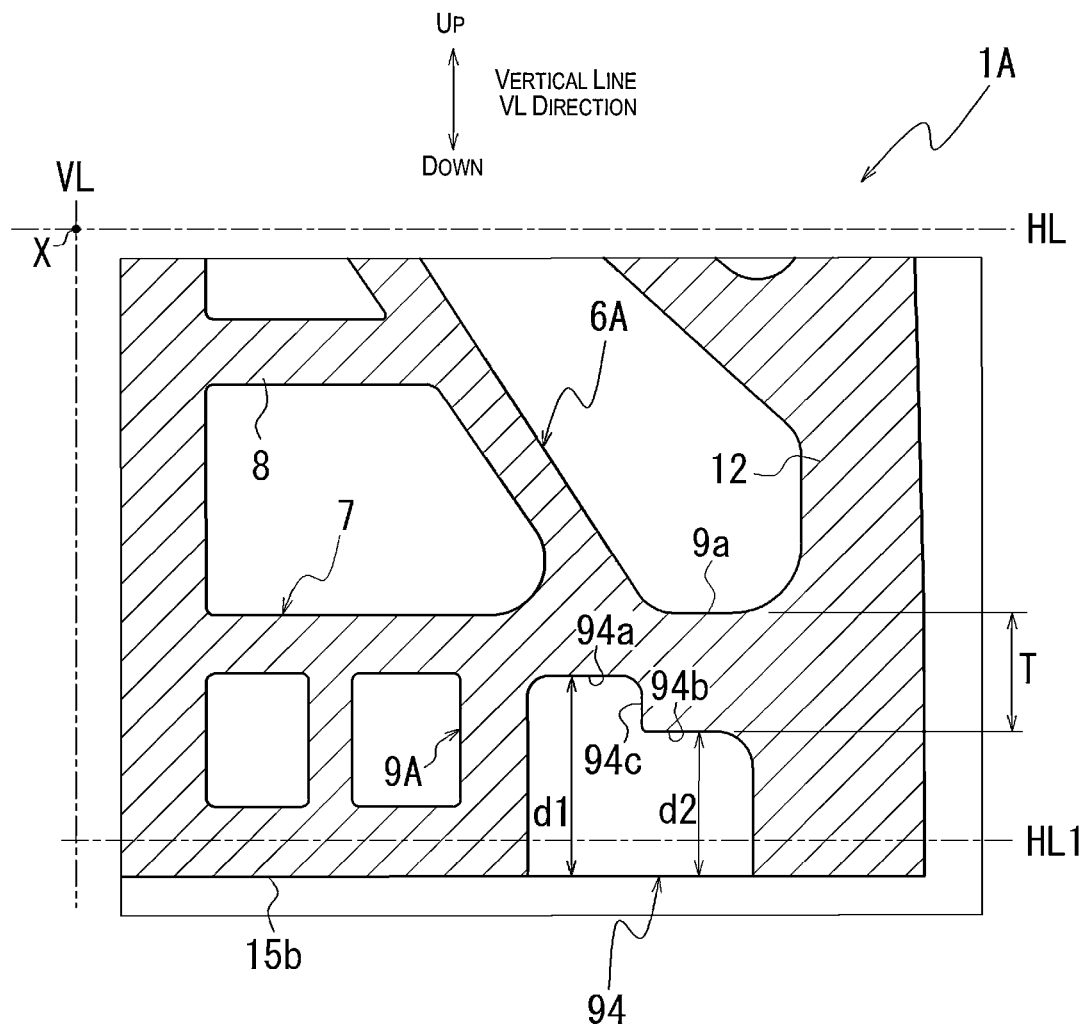
FIG. 18 is a diagram illustrating a transmission case according to a variant.

FIG. 18 is a diagram illustrating a transmission case 1A according to a variant.

As shown in FIG. 18, the transmission case 1A has a bulging section 9A provided with one recess 94.

The recess 94 opens in the bottom end surface 15b of the wall section 15 and is recessed upward in the direction of the vertical line VL from the bottom end surface 15b. The bottom surface of the recess 91 is made up of a bottom surface 94a having a depth d1, a bottom surface 94b having a depth d2, and a stepped surface 94c that connects the bottom surface 94a and the bottom surface 94b.

The bottom surfaces 94a, 94b are oriented along the direction of the straight line HL1. The bottom surface 94b of the recess 94 is located farther away from the vertical line VL than the bottom surface 94a.

In other words, the bottom surfaces 94a, 94b and the stepped surface 94c of the recess 94 are stepped so as to approach the bottom end surface 15b in steps with increasing distance from the vertical line VL.

In the transmission case 1A, the thickness T between the bottom surface 94b and the top surface 9a of the bulging section 9A is greater than the thickness between the bottom surface 94a and the top surface 9a of the bulging section 9A (see FIG. 18).

Therefore, in the casting mold, the bulging section 9A' has a large opening on the joining section 12' side. Therefore, during casting, the molten metal Q can more easily be directed into the bulging section 9A'. The molten metal Q brought into the bulging section 9A' moves toward the bottom surface 94a' and then toward the rib 6A', the rib 7', and the rib 8'.

Thus, it is possible to promote supply of the molten metal Q to the areas around the thick sections 157', 158' that the molten metal Q would otherwise have difficulty reaching. The occurrence of a difference (imbalance) in the supply speed of the molten metal Q can thereby be reduced, and the gas G generated by the molten metal Q can be progressively pushed toward the outlet M4. The occurrence of casting cavities in the transmission case 1A can thereby be reduced.

The transmission case 1A according to variant 1 has the following configuration, for example.

(5) The bottom surfaces 94a, 94b and the stepped surface 94c of the recess 94 are formed in a stepped shape so that the bottom end surface 15b is approached in steps with increasing distance from the vertical line VL.

With this configuration, the molten metal Q is more easily brought into the bulging section 9A'. The supply of the molten metal Q can thereby be promoted in regions around the thick sections 157, 158 in which the ribs 6' cannot be provided. Thus, it is possible to provide a transmission case 1A in which the occurrence of cavities is reduced and the yield is improved. It is also possible to provide a plurality of recesses and form the bottom surfaces of the recesses in a direction along the straight line HL1, forming the bottom surfaces of the plurality of recesses to approach the bottom end surface 15b stepwise with increasing distance from the vertical line VL. Further, the bottom surfaces may also be formed in a direction along the sloped surfaces of the recesses and the straight line HL1, and sloped surfaces and a stepped shapes may also be combined.

It should be noted that, in the present embodiment, the transmission case 1 for a vehicle was illustrated as one example of a case, but this aspect is not a limitation. The present invention may be applied to any case molded using casting, including cases other than transmission cases for vehicles.

An embodiment of the present invention was described above, but the embodiment was merely one application example of the present invention and does not limit the technical scope of the present invention to the specific configuration in the embodiment. The present invention may be suitably modified within the scope of the technical concept of the invention.

EXPLANATION OF THE REFERENCE SYMBOLS 1, 1A Transmission case (case); 5 Driving force transmission device; 6, 6A Ribs (first ribs); 61 One end section; 7 Rib (second rib); 71 One end section; 8 Rib (third rib); 9 Bulging section (region in which the recesses are provided in the wall section); 15 Wall section; 151 Shaft support section (annular section); 15b Bottom end surface; 53 Output shaft (shaft); 91 Recess; 92 Recess; 94 Recess; 91a Bottom surface; 92a Bottom surface; 94a Bottom surface; 94b Bottom surface; 94c Stepped surface; VL Vertical line; and X Axis of rotation (central axis of the shaft).

The invention claimed is:

1. A case for housing a driving force transmission device, comprising:
a wall section defining a through-hole through which a shaft for transmitting driving force is configured to pass, wherein
the wall section, as viewed from an axial direction of the shaft, includes
an annular section surrounding the through-hole,
a plurality of first ribs that extend radially outward from the annular section,
a second rib that crosses a vertical line that passes through an axial center of the shaft from one side of the vertical line to the other side of the vertical line, and
at least one recess that opens at a bottom end surface of the wall section, the at least one recess being recessed in a direction along the vertical line, a bottom surface of the at least one recess, as viewed from the axial direction, having a shape such that a side farther from the vertical line is located closer to a bottom end surface side, and
one end of the second rib diverges from a region of the wall section in which the at least one recess is provided.

2. The case according to claim 1, wherein
the bottom surface of the at least one recess is a sloped surface that is sloped to approach the bottom end surface with increasing distance from the vertical line.

3. The case according to claim 2, wherein
the at least one recess is comprised of a plurality of recesses,
as viewed from the axial direction, the recesses open in the bottom end surface of the wall section,
as viewed from the axial direction, the recesses are arranged in a direction intersecting the vertical line, and
a distance between the bottom surface of each of the recesses and the bottom end surface decreases with increasing distance from the vertical line.

4. The case according to claim 3, wherein
the bottom surface of each of adjacent ones of the recesses is a sloped surface that is continuously sloped in a direction approaching the bottom end surface with increasing distance from the vertical line.

5. A for housing a driving force transmission device, comprising:
a wall section defining a through-hole through which a shaft for transmitting driving force is configured to pass, wherein
the wall section, as viewed from an axial direction of the shaft, includes
an annular section surrounding the through-hole,
a plurality of first ribs that extend radially outward from the annular section,
a second rib that crosses a vertical line that passes through an axial center of the shaft from one side of the vertical line to the other side of the vertical line, and
at least one recess that opens at a bottom end surface of the wall section, the at least one recess being recessed in a direction along the vertical line, a bottom surface of the at least one recess, as viewed from the axial direction, having a shape such that a side farther from the vertical line is located closer to a bottom end surface side, a region of the wall section in which the at least one recess is provided is connected to one end of the second rib, and the bottom surface of the at least one recess is stepped so as to approach the bottom end surface with increasing distance from the vertical line.

6. A case for housing a driving force transmission device, comprising:

a wall section defining a through-hole through which a shaft for transmitting driving force is configured to pass, wherein the wall section, as viewed from an axial direction of the shaft, includes an annular section surrounding the through-hole, a plurality of first ribs that extend radially outward from the annular section, a second rib that crosses a vertical line that passes through an axial center of the shaft from one side of the vertical line to the other side of the vertical line, and at least one recess that opens at a bottom end surface of the wall section, the at least one recess being recessed in a direction along the vertical line, a bottom surface of the at least one recess, as viewed from the axial direction, having a shape such that a side farther from the vertical line is located closer to a bottom end surface side, a region of the wall section in which the at least one recess is provided is connected to one end of the second rib, as viewed from the axial direction, the wall section has a third rib between the annular section and the second rib in the direction of the vertical line, the third rib branches off of one of the first ribs and extends in a direction approaching the vertical line, and one end section of the one of the first ribs, from which the third rib branches, connects to the region of the wall section in which the recess is provided.

* * * * *